United States Patent [19]

Mizuno et al.

[11] 4,355,468
[45] Oct. 26, 1982

[54] MICROMETER

[75] Inventors: Ichiro Mizuno; Masao Nakahara, both of Kawasaki, Japan

[73] Assignee: Mitutoyo Mfg. Co., Ltd., Tokyo, Japan

[21] Appl. No.: 247,273

[22] Filed: Mar. 29, 1981

[30] Foreign Application Priority Data

Mar. 31, 1980 [JP] Japan .............................. 55-42992[U]
May 14, 1980 [JP] Japan .............................. 55-66051[U]

[51] Int. Cl.³ .............................................. G01B 5/02
[52] U.S. Cl. .............................................. 33/147 F
[58] Field of Search .............. 33/147 R, 147 H, 147 J, 33/147 T, 147 F, 143 F, 143 K

[56] References Cited

U.S. PATENT DOCUMENTS 342,245  5/1886  Cross ................................. 33/147 F
1,345,236  6/1920  Powers et al. ..................... 33/147 T
3,447,244  6/1969  Scholl ................................. 33/147 J
3,974,570  8/1976  Uchino ............................... 33/147 T Primary Examiner—Harry N. Haroian
Attorney, Agent, or Firm—Koda and Androlia

[57] ABSTRACT

A micrometer comprising a letter 'U' shaped frame, an anvil fixed on one end of said frame and directed to the other end thereof and a spindle supported on said frame in a manner to be axially movable from the other end at one end and, during measuring, the forward end thereof comes into abutting contact with an article being measured, a control knob connected to said spindle and projected outwardly from the frame, a rack formed on the spindle in the axial direction thereof and dial indicator driven by the spindle, when the spindle axially moves, through pinions being meshed with the rack, the spindle being moved by reciprocating operation of the control knob, which is operated by one hand gripping the micrometer, and a value of movement of the spindle being read by means of the dial indicator.

6 Claims, 10 Drawing Figures

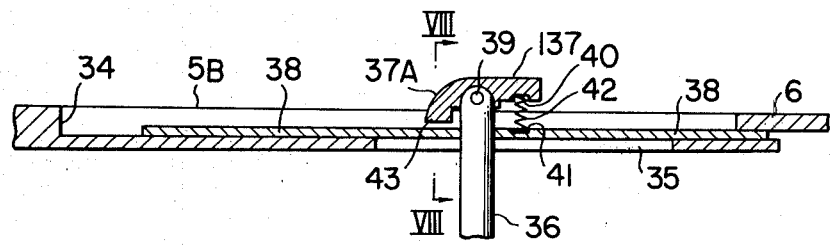
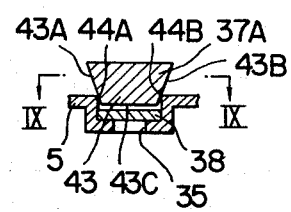
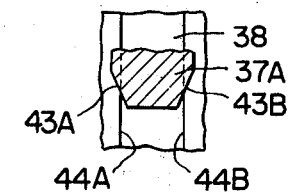
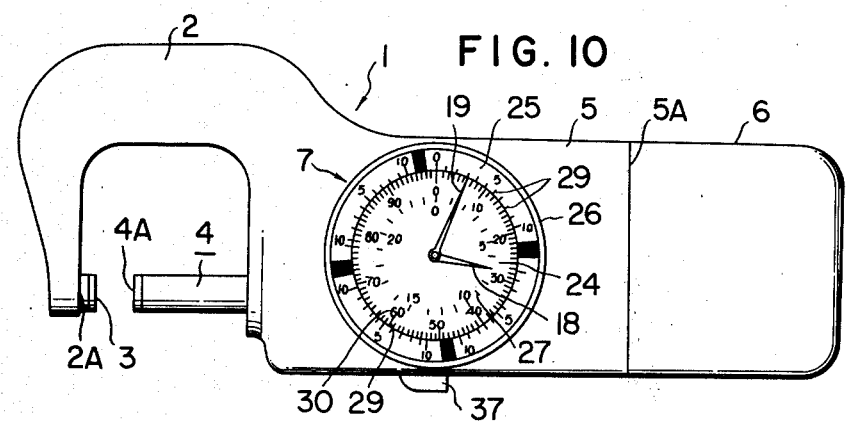

MICROMETER

BACKGROUND OF THE INVENTION

1. Field of the Invention

This invention relates to micrometers, and particularly to improvements in a micrometer comprising: a frame; an anvil fixed on one end of the frame and directed to the other end thereof; and a spindle supported on said frame in a manner to be axially movable from the other end to one end and, during measuring, the forward end thereof comes into abutting contact with an article being measured.

2. Description of the Prior Art

In general, a micrometer is of such an arrangement that a thimble is rotated, and the rotation is imparted to a spindle through a screw mechanism, so that the spindle can be rotated and linearly moved. Consequently, the arrangement of the conventional micrometer, in which the value of movement of the spindle is very small as compared with the number of rotation of the thimble, makes it difficult to move the spindle greatly and quickly for measuring work. Furthermore, the thimble is provided at an end portion of a grip portion of the micrometer coaxially with the grip portion, so that it is difficult to operate the thimble while holding the grip portion by one hand. Then, in order to facilitate operating the thimble by one hand, it is necessary to provide an auxiliary member for gripping the micrometer. However, the provision of such an auxiliary member for gripping the micrometer leads to increased weight of the micrometer, whereby the operating efficient is lowered and the manufacturing cost is increased.

SUMMARY OF THE INVENTION

It is therefore the primary object of the present invention to provide a micrometer which can be quickly operated for measuring work.

It is another object of the present invention to provide a micrometer in which the spindle can be movable only by one hand while gripping the micrometer.

It is a further object of the present invention to provide a micrometer in which operation of moving the spindle and operation of clamping the spindle can be quickly performed.

It is a still further object of the present invention to provide a micrometer in which operation of moving the spindle and operation of clamping the spindle can be quickly performed, while gripping the micrometer by one hand.

It is a yet further object of the present invention to provide a micrometer in which operation of moving the spindle and operation of the auxiliary dials can be performed, while gripping the micrometer by one hand.

One of the abovedescribed objects can be achieved by an arrangement according to the present invention that in a micrometer comprising a letter 'U' shaped frame, an anvil fixed on one end of said frame and directed to the other end thereof and a spindle supported on said frame in a manner to be axially movable from the other end to one end and, during measuring, the forward end thereof comes into abutting contact with an article being measured, further comprises a control knob connected to said spindle and projected outwardly from said frame, a rack formed on said spindle in the axial direction thereof and a dial indicator driven by the spindle, when the spindle axially moves, through pinions being meshed with said rack, said spindle is moved by reciprocating operation of said control knob and a value of movement of the spindle is read by means of the dial indicator.

Further, one of the abovedescribed objects can be achieved by an arrangement according to the present invention that the dial indicator and control knob are provided on a body integral with the frame.

Further, one of the abovedescribed objects can be achieved by an arrangement according to the present invention that a hollow body is secured to the rear end of said body, the rear end portion of said spindle is projected from the rear end of said body into the internal space of the hollow body, and said hollow body serves as a grip portion when the micrometer is operated by one hand.

Further, one of the abovedescribed objects can be achieved by an arrangement according to the present invention that the spindle and a control knob are connected to each other through an arm, which extends through a slit formed on a wall of said body in parallel to the axis of the spindle, whereby the arm is guided by the slit and serves as a stopping the turning of the spindle.

Further, one of the abovedescribed objects can be achieved by an arrangement according to the present invention that the slit is covered by a plate connected to the arm or control knob and movable integrally therewith over the entire length of movement of the arm or control knob.

Further, one of the abovedescribed objects can be achieved by an arrangement according to the present invention that the plate is guided by an elongated groove formed on the body in a fashion to be parallel to the slit and broader and longer than the slit.

Further, one of the abovedescribed objects can be achieved by an arrangement according to the present invention that the micrometer comprises: an arm connected to the spindle and projected outwardly from the frame; a body integral with the frame; a rack formed on the spindle in the axial direction thereof; a dial indicator driven by the spindle through pinions being meshed with the rack when the spindle moves in the axial direction thereof; and a control knob tiltably connected to the outer end of the arm and biased in one direction of tilting by means of a spring, whereby the control knob is pressed at one end thereof against the body in the normal condition and, when the control knob is pressed at the other end against a biasing force of the spring, the control knob is brought out of contact from the body.

Further, one of the abovedescribed objects can be achieved by an arrangement according to the present invention that: the dial indicator and control knob are provided on the body; the arm extends through a slit formed on a wall of the body in parallel to the axis of the spindle, whereby the arm is guided by the slit and serves as a stopper for stopping the turning of the spindle; the slit is covered by a plate connected to the arm or control knob and moving integrally therewith over the entire length of movement of the arm or control knob; the plate is guided by an elongated groove formed on the body in a fashion to be in parallel to the slit and broader and longer that the slit; and an end of said control knob, which is biased to the body by a spring, has tapered surfaces thereon to bite into said elongated groove.

Further, one of the abovedescribed objects can be achieved by an arrangement according to the present invention that the control knob is disposed downwardly of the dial indicator with the dial indicator being seen in front thereof.

Further, one of the abovedescribed objects can be achieved by an arrangement according to the present invention that the dial indicator is provided with a rotary type vernier disposed adjacent the control knob.

Further, one of the abovedescribed objects can be achieved by an arrangement according to the present invention that a plurality of vernier dials are provided being spaced apart from one another in the circumferential direction.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein;

FIG. 7 is a sectional view enlargedly showing the essential portions of another embodiment of the micrometer according to the present invention;

FIG. 8 is a sectional view taken along the line VIII—VIII in FIG. 7;

FIG. 9 is a sectional view taken along the line IX—IX in FIG. 8; and

FIG. 10 is a plan view showing a further embodiment of the micrometer according to the present invention.

DETAILED DESCRIPTION OF THE INVENTION

Detailed description will hereunder be given of the embodiments of the present invention with reference to the drawings.

Figure 1:
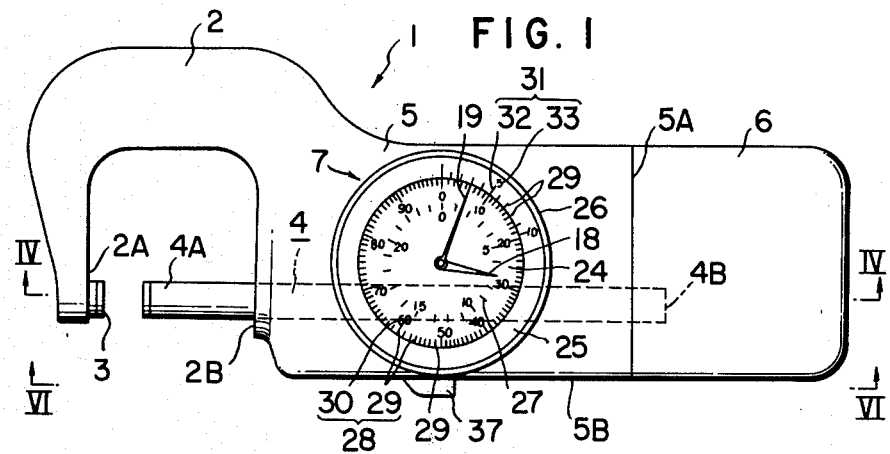
FIG. 1 is a plan view showing an embodiment of the micrometer according to the present invention.
Figure 2:
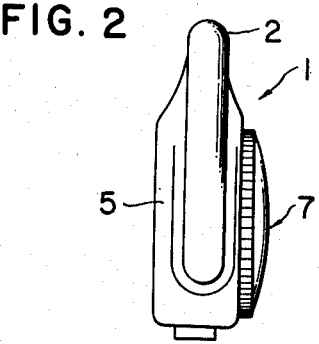
FIG. 2 is a left side view showing the micrometer.
Figure 3:
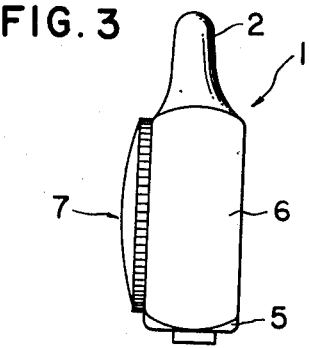
FIG. 3 is a right side view thereof.
Figure 5:
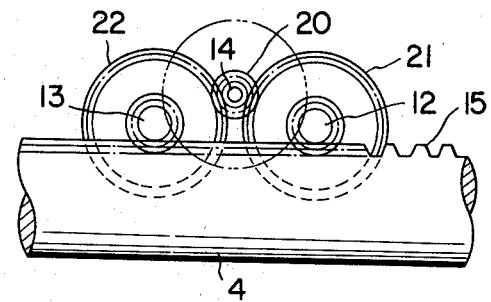
FIG. 5 is a partially enlarged plan view showing the relationship between the spindle, rack and the pinions being meshed therewith as illustrated in FIG. 4.

As shown in FIGS. 1 through 3, the micrometer 1 according to the present invention has a letter 'U' shaped frame 2. An anvil 3 is solidly secured to one inner end surface 2A of the frame 2, and the forward end 4A of a spindle 4 is projected toward the anvil 3 from the other inner end surface 2B of the frame 2.

The spindle 4 extends through the frame 2 and a body 5 integrally formed thereon and is axially, linearly movably supported by the frame 2 and the body 5, whereby an article being measured is slightly clamped between the forward end 4A and the anvil 3 for the measurement.

A hollow body 6 is secured to a rear end surface 5A of the body 5, whereby the rear end of the spindle 4 is projected into the inner space of the hollow body 6.

Secured to the front surface of the body 5 is a dial indicator 7 for indicating the value of the linear movement of the spindle 4. This dial indicator 7 is driven by a drive mechanism built in the body 5.

Figure 4:
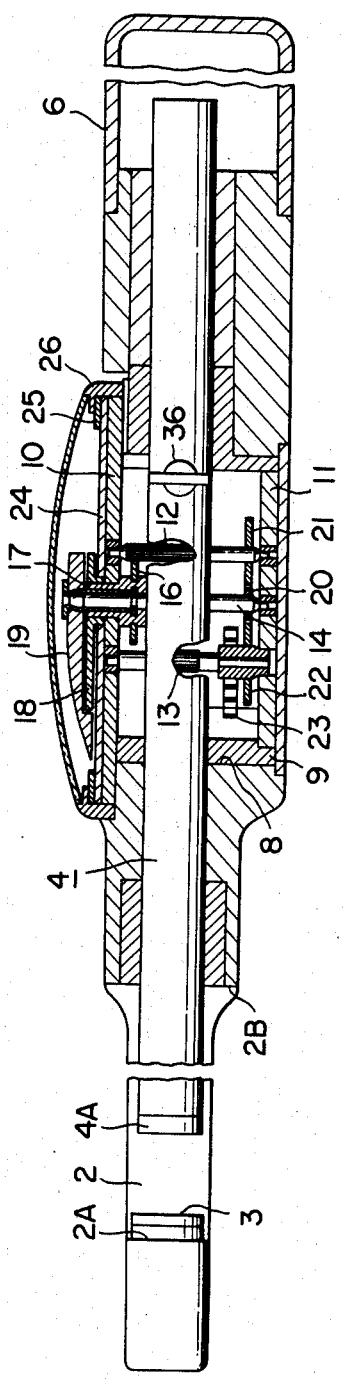
FIG. 4 is an enlarged sectional view taken along the line IV—IV in FIG. 1.

As shown in FIG. 4, the drive mechanism has a cylindrical frame 9 coupled into a hole 8 penetrated through the body 5 in the thickness-wise direction thereof. The cylindrical frame 9 is provided at opposite openings thereof with base plates 10 and 11. Pinions 12, 13 and a pointer shaft 14 are rotatably supported by the aforesaid base plates 10 and 11 therebetween.

Formed at the back surface (in FIG. 4) of the aforesaid spindle 4 in the axial direction thereof is a rack 15, which is constantly in meshing engagement with the pinion 12. This pinion 12 has a wide face width and is in meshing engagement with a gear 16 too. This gear 16 is coaxially secured to a cylindrical pointer shaft 17 relatively, rotatably coupled to the pointer shaft 14, and imparts the rotation of the pinion 12 to the cylindrical pointer shaft 17. The cylindrical pointer shaft 17 is projected from the base plate 10 and secured at one end thereof with a shorter needle 18 of the dial indicator 7.

Furthermore, the aforesaid pointer shaft 14 is projected from the cylindrical pointer shaft 17 further to the front and secured at the projecting end thereof with a longer needle 19. A gear 20 is secured to the pointer shaft 14 at a position adjacent the base plate 11. This gear 20 is in meshing engagement with a gear 21 secured to the shaft of the aforesaid pinion 12 and further in meshing engagement with a gear 22 coaxially secured to the shaft of the pinion 13. The gear 22 is relatively rotatable with the shaft of the pinion 13 and a hair spring 23 for eliminating a back-lash is provided between the gear 22 and the shaft of the pinion 13.

As shown in FIGS. 1 and 4, the dial indicator 7 includes a main dial plate 24 fixed on the base plate 10 and an auxiliary dial plate 25. This auxiliary dial plate 25 is coupled and fixed to the inner peripheral surface of an outer ring 26 rotatably coupled to the outer periphery of the base plate 10. The main dial plate 24 is provided with a first dial 27 for reading an indicated value in the upper place indicated by the shorter needle 18 and a second main dial 28 for reading an indicated value in the lower place indicated by the longer needle 19. The second main dial 28 is circumferentially provided at the peripheral portion of the main dial plate 24. Designated at 29 is a dial line of the second main dial 28 and 30 numbers for reading the second main dial 28.

The auxiliary dial plate 25 is slidably, closely attached onto the peripheral portion of the main dial plate 24, and provided at the upper surface thereof with a vernier dial 31. Denoted at 32 are dial lines of the vernier dial 31, and 33 numerals for reading the vernier dial 31.

Figure 6:
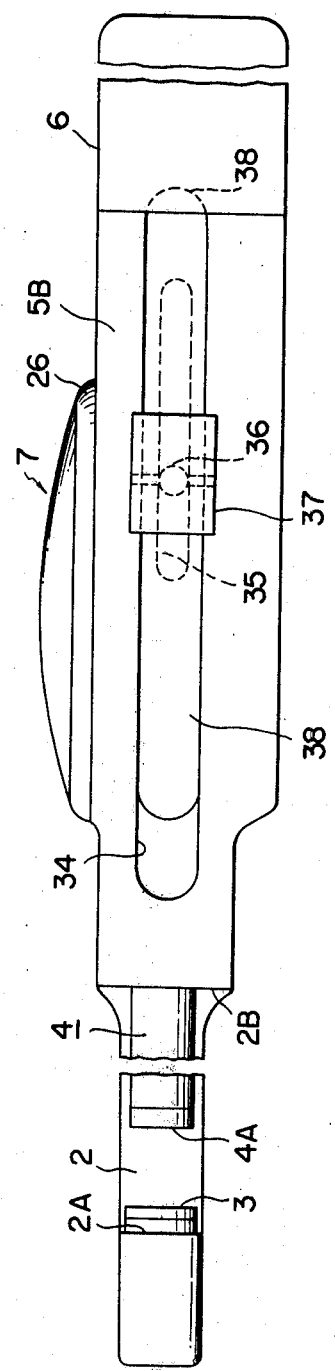
FIG. 6 is an enlarged view in the direction indicated by the arrows from line VI—VI in FIG. 1.

With the dial indicator 7 being seen in front thereof, an elongated groove 34 extending in the same direction as the axis of the spindle 4 is formed at the lower end surface 5B of the body 5 as shown in FIG. 6. Formed at the bottom of this elongated groove 34 is a slit 35 having a small width and extending through the wall surface of the body 5 in the same direction as the elongated groove 34. This slit 35 is opposed to the intermediate portion of the spindle 4 and made equal in length to the stroke of the spindle 4. This spindle 4 is integrally formed thereon with an arm 36 extending through the slit 35 outwardly. The forward end portion of this arm 36 is projected through the slit 35 into the elongated groove 34. The arm 36 is closely engaged with the body 5 in the width-wise direction of the slit 35, to thereby stop the turning of the spindle 4 in the circumferential direction thereof.

The arm 36 is provided at the forward end thereof with a control knob 37. Designated at 38 is a plate integrally formed on the arm 36 and slidably coupled into the elongated groove 34, the length of which is sufficient to constantly cover the slit 35 when the plate 38 moves integrally with the control knob 37 and the arm 36.

Furthermore, the aforesaid elongated groove 34 reaches the rear end surface 5A of the body 5, one end portion of the plate 38 is adapted to be projected into the hollow body 6 when the plate 38 moves to the right in FIGS. 4 and 6 beyond a predetermined value.

Description will now be given of operation of the micrometer with the abovedescribed arrangement. With the hollow body 6 being held the right hand, the control knob 37 is linearly moved by a thumb with respect to the anvil 3, so that the spindle 4 can be linearly moved with respect to the anvil 3. By this, the value of linear movement of the spindle 4 is imparted to the shorter needle 18 and the longer needle 19 through the rack 15 and a series of gears (reference numerals being omitted) operationally associated therewith. A value in the upper place of the linear movement of the spindle 4 is read by means of the shorter needle 18 and the first main dial 27. Furthermore, a value in the lower place of the linear movement of the spindle 4 is read by means of the longer needle 19 and the second main dial 28.

Further, the outer ring 26 is rotated to bring the dial line 32 at the position "0" of the vernier dial 31 into registration with the longer needle 19, and thereafter, a registration is sought between a plurality of dial lines 32 and the dial line 29 of the second main dial 28. A position of the dial line 32 in registration thus obtained is read in the relationship between the numeral 33 and another dial line 29. The value thus read then is a mean value between the dial lines 29, 29 of the second main dial 28, and is the lowest value of the linear movement of the spindle 4. Here, the auxiliary dial plate 25 can be operated by a thumb with the hollow body 6 being held by one hand in the same manner as the control knob 37.

As shown in FIGS. 7 through 9, a second embodiment of the present invention has the control knob 137 functioning as a clamp.

In this embodiment, a control knob 137 is tiltably supported at the forward end of the arm 36 through a pin 39. A compression coil spring 42 is confined between a recess 40 formed at the rear surface of the control knob 137 and a recess 41 formed at the front surface of the plate 38, which is opposed to the recess 40, whereby the control knob 137 is biased in a direction in which one end portion 37A thereof is brought into pressing contact with the body 5.

This end portion 37A is formed with an engaging projection 43 extending toward the elongated groove 34. The engaging projection has tapered side surfaces 43A, 43B to thereby be tapered off into an end edge. The forward end edge of the engaging projection 43 is smaller in width than the width of the elongated groove 34 and the root of the engaging projection 43 is satisfactorily larger in width than the elongated groove 34, so that the intermediate portions of the side surfaces 43A, 43B of the engaging projection 43 can be brought into abutting contact with corner portions 44A, 44B of the body 5 at an opening of the elongated groove 34. Moreover, it is designed that, when the side surfaces 43A, 43B are in abutting contact with the corner portions 44A, 44B, a clearance can be held between the end edge 43C and the dust preventing plate 38.

In this embodiment, under the normal condition the engaging projection 43 is brought into pressing contact with the elongated groove 34 and the corner portions 44A, 44B of the body by means of the spring 42 in such a manner that, as if the engaging projection 43 bites thereinto, and fixed by a friction, so that the spindle 4 is clamped and cannot be linearly moved by a force of a small value. Consequently, the distance between the anvil 3 and the forward end 4A of the spindle 4 can be fixed, so that the micrometer can be utilized as a gauge for measuring as to whether articles being measured in large quantities have a predetermined total thickness or not. To linearly move the control knob 137, an end portion on the side where the spring 42 is confined is pressed against the bias of the spring 42, whereby the engagement between the engaging projection 43 and the corner portions 44A, 44B is released. This operation can be also performed with the body 5 and the hollow body 6 being grasped by one hand.

In the abovedescribed embodiment, the engaging projection 43 disposed on the side of the anvil 3 is provided on the control knob 137, however, the engaging projection 43 should not necessarily be provided at this position, but may be provided at one end portion of the control knob 137 so that the spring 42 may be confined between the end portion 37A and the plate 38.

FIG. 10 shows a third embodiment of the present invention, in which a plurality of vernier dials of the dial indicator 7 are provided being spaced apart from one another in the circumferential direction. In this case, only a slight rotation of the outer ring 26 can bring the "0" position of the vernier dial 31 in registration with the longer needle 19, so that reading of a measured value can be facilitated.

It should be apparent to those skilled in the art that the abovedescribed embodiments are merely representative, which represent the applications of the principles of the present invention. Numerous and varied other arrangements can be readily devised by those skilled in the art without departing from the sprit and the scope of the invention.

What is claimed is:

1. A micrometer comprising a letter 'U' shaped frame, an anvil fixed on one end of said frame and directed to the other end thereof and a spindle supported on said frame in a manner to be axially movable from the other end to one end and, during measuring, the forward end thereof comes into abutting contact with an article being measured, characterized in that said micrometer further comprises; a body integral with the frame; an arm connected to said spindle and projected outwardly from the body; a rack formed on said spindle in the axial direction thereof; a dial indicator driven by the spindle through pinions being meshed with said rack when the spindle moves in the axial direction thereof; and a control knob tiltably connected to the outer end of said arm and biased in one direction of tilting by means of a spring, whereby said control knob is pressed at one end thereof against the body side in the normal condition and, when said control knob is pressed at the other end against a biasing force of the spring, said control knob is brought out of contact from the body side.

2. A micrometer as set forth in claim 1, wherein: said dial indicator and control knob are provided on the body; said arm extends through a slit formed on a wall of said body in parallel to the axis of the spindle, whereby said arm is guided by the slit and serves as a stopper for stopping the turning of the spindle; said slit is covered by a plate connected to said arm or control knob and moving integrally therewith over the entire length of movement of said arm or control knob; said plate is guided by an elongated groove formed on the body in a fashion to be in parallel to the slit and broader and longer than the slit; and an end of said control knob, which is biased to the body by a spring, has tapered surfaces thereon to bite into said elongated groove.

3. A micrometer as set forth in claim 1, wherein said dial indicator and control knob are provided on the body, and said body is connected thereto with a hollow body for serving as a grip portion, when the micrometer is operated by one hand.

4. A micrometer as set forth in claims 1, 2 or 3, said control knob is disposed downwardly of the dial indicator with the dial indicator being seen in front thereof.

5. A micrometer as set forth in claim 4, said dial indicator is provided with a rotary type vernier disposed adjacent the control knob.

6. A micrometer as set forth in claim 5, a plurality of vernier dials are provided being spaced apart from one another in the circumferential direction.

* * * * *